E. A. McKOY.
TURPENTINE GATHERING APPARATUS.
APPLICATION FILED JULY 10, 1907.
906,059.
Patented Dec. 8, 1908.
2 SHEETS—SHEET 1.
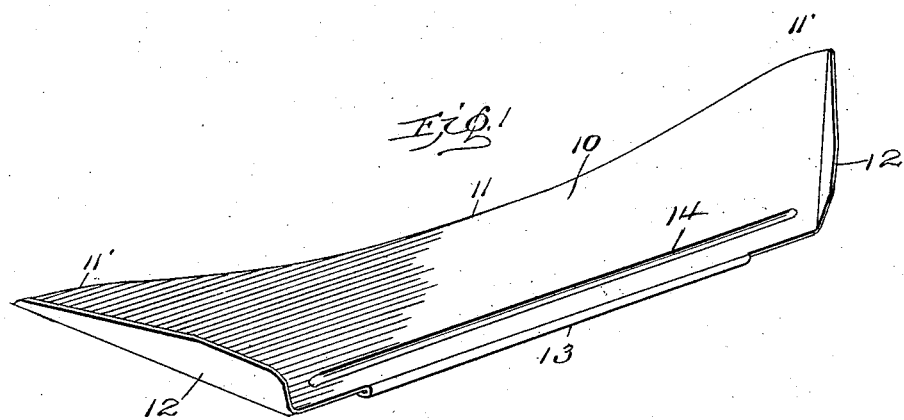
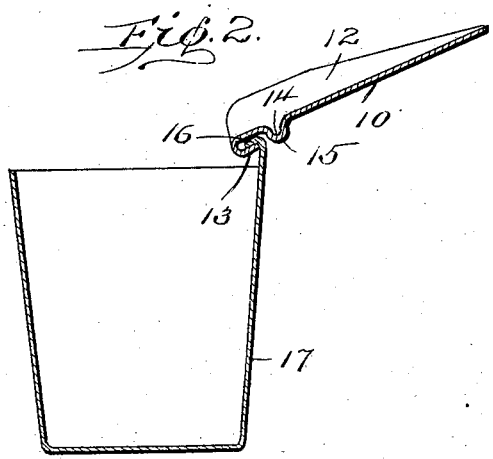

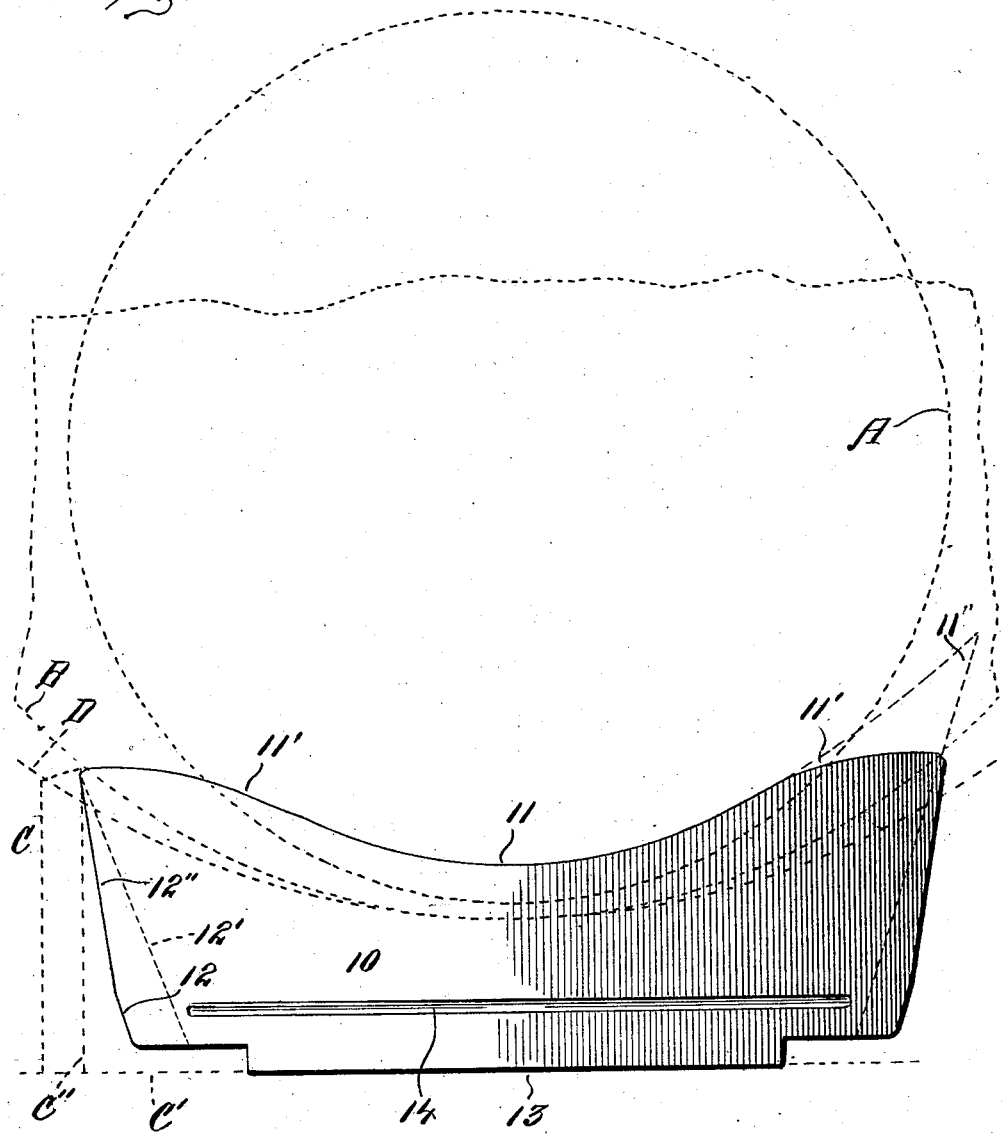

UNITED STATES PATENT OFFICE.

EDWIN A. McKOY, OF NEW ORLEANS, LOUISIANA.

TURPENTINE-GATHERING APPARATUS.

No. 906,059.  Specification of Letters Patent.  Patented Dec. 8, 1908.

Application filed July 10, 1907. Serial No. 383,090.

*To all whom it may concern:*

Be it known that I, EDWIN A. McKOY, a citizen of the United States, residing at New Orleans, in the parish of Orleans and State of Louisiana, have invented certain new and useful Improvements in Turpentine-Gathering Apparatus; and I do hereby declare the following to be a full, clear, and exact description of the invention, such as will enable others skilled in the art to which it appertains to make and use the same.

This invention relates to turpentine cups, and has for an object to provide means for interengagement between the receptacle and apron eliminating to a great degree the probability of accidental displacement of the receptacle.

A further object of the invention is to provide in an apron means for engaging within the incision of a tree, and so formed that the incision will be of the minimum depth in trees of varying sizes.

A further object of the invention is to provide an apron embodying transverse flanges at the opposite ends proportioned to be produced from the minimum amount of material whereby great economy is insured.

With these and other objects in view, the invention comprises certain novel constructions, combinations and arrangements of parts, as will be hereinafter fully described and claimed.

In the drawings:—Figure 1 is a perspective view of the apron forming a part of the present invention. Fig. 2 is a transverse, vertical sectional view through the apron and receptacle forming the subject-matter of this application. Fig. 3 is a top plan view of the improved apron with the end flanges turned down and shown in plan as in the blank and showing in dotted lines the circumference of different sizes of trees and the method of employing the apron with the trees of various sizes.

Like characters of reference designate corresponding parts throughout the several views.

The apron forming a part of the present invention comprises a substantially plain body portion 10 having a concave upper edge, as shown at 11, which concave or curvature does not extend throughout the entire length of the apron, but is reversely curved adjacent opposite ends, as at 11′.

It will be understood that the upper edge of the apron is inserted in an incision of the gum bearing tree and with a tree proportioned to the apron, as the circle A, but a portion of the length is engaged, and that within the curvature or concave line 11. When, however, a large tree corresponding to the apron, as the arc B, is operated upon the reverse curve formed at 11′ obviates the necessity of inserting the end or corner of the apron to any very great or considerable distance within the tree, as shown by comparing the curvature of the arc B with the curvature of the upper edge of the apron. The opposite ends of the apron are provided with upturned flanges 12 bent upon the line 12′ to a plane approximately or substantially at right angles with the body of the apron. The edge of the flange 12 is cut away, as at 12″, from a point intermediate the ends of the flange and terminating approximately or substantially at a point with the dotted line 12′, upon which the flange is bent.

By the cutting off or tapering of the upper edge of the flange 12, as shown at 12″, an amount of material represented by the area inclosed within the broken line C—C′ is saved without detracting from the rigidity, strength or reliability of the apron, as the upper edge is inserted within the incision of the tree and is supported thereby. As shown particularly in Fig. 3, the blank from which the present apron may be cut is represented by the line C′—C″, whereas the blank from which an apron can be cut with the flange of equal width throughout its length would be represented by C—C′. The amount of material represented by the area C, while not great, amounts to a very considerable amount when a great quantity of the aprons are being manufactured and the saving resultant therefrom is an item of considerable importance.

When the apron is employed with a tree larger than the tree B, as for instance, represented by the arc D, the upper ends of the flanges are easily inserted within the wood of the tree being pointed as shown whereby the depth of incision is still maintained at a minimum, as distinguished from a flange with a wide upper end which would abut against the tree of the size of B, and prevent the further insertion of the apron. It is well known that these aprons are employed upon trees of various sizes, some of them very large in circumference, and provision must, therefore, be made to make the apron operative with any size tree encountered. The formation of the apron with the curve 11 and reverse curve 11' is also a considerable saving in material, the dotted area 11'' indicating the extent to which the upper corner of the apron would be projected with a continuous curvature. The said area 11'' also shows the extent to which the apron with such a corner must be inserted into the tree instead of corresponding substantially with the curvature by reason of the reverse curve 11'. The incision in which the apron is inserted is formed by a cutting tool in the shape of an ax but it is practically impossible to make an incision in which a sharp corner such as shown at 11'' can be successfully seated.

At the lower longitudinal edge the apron is provided with a hook member 13 here shown as comprising a downwardly and rearwardly turned flange member adjacent to which a groove 14 is pressed in the apron producing thereby a rib 15 upon the under side of the apron adjacent to but slightly spaced from the edge of the flange 13. The flange 13 is proportioned and positioned to interengage with a hook or flange member 16 upstanding from the side of a receptacle 17, the said hook or flange 16 being so proportioned that it may not be removed from the flange 13 without abutting against and engaging the rib 15 unless the same is removed by longitudinal slidable movement or by tilting the lower side of the receptacle forwardly, thus permitting the shoulder of the flange 16 to pass beneath and under the rib 15.

While but one of the grooves 14 and resultant ribs 15 is shown, it is to be understood that any desired number may be employed, the said ribs serving not only to maintain the flanges 13 and 16 in interengagement, but also to strengthen the apron against bending transversely. It will usually not be found necessary to employ more than one of these ribs, as the upper portion of the apron is supported and stiffened by engagement with the tree, the said upper edge being inserted in the incision as above referred to, and only the lower longitudinal edge extending outwardly beyond the circumference of the tree.

What I claim is:—

1. In a device of the class described, an apron provided with engaging means adjacent its lower edge, a receptacle adapted for interengagement with the engaging means, and a rib formed upon the apron and positioned to maintain the engaging means in interengagement.

2. In a device of the class described, an apron provided with engaging means depending below its normal plane, a rib formed upon the under side of the apron and spaced from the engaging means, and a receptacle provided with means for interengagement with the engaging means of the apron and to be maintained in interengagement by the rib.

3. An apron provided with a receptacle-engaging means, and a stop positioned to prevent accidental displacement of the receptacle.

4. An apron provided with a receptacle-engaging means, and a stop positioned adjacent the engaging means adapted to prevent accidental displacement of the receptacle.

5. In a device of the class described, an apron provided with a flange at its lower longitudinal edge, a receptacle provided with means for interengagement with the flange, and a rib formed adjacent the flange and adapted to engage the receptacle.

6. In a device of the class described, an apron comprising a substantially plain body portion, a rearwardly and downwardly extending flange formed adjacent the lower longitudinal edge of the apron, and a downwardly extending rib formed adjacent the flange.

7. In a device of the class described, an apron provided with an engaging hook at its lower longitudinal edge, a receptacle provided with an upstanding hook adapted for interengagement with the hook of the apron, and a stop formed upon the apron positioned to maintain the hooks in interengagement.

8. In a device of the class described, an apron provided with a hook extending longitudinally along its lower edge, a receptacle provided with an upstanding hook extending longitudinally thereof, and proportioned for engagement with the hook of the apron, and a stop extending longitudinally of the apron and spaced from the hook and positioned to maintain the hooks of the receptacle and apron in interengagement.

9. In a device of the class described, an apron provided with engaging means, a rib extending longitudinally of the apron, a receptacle adapted to engage upon the engaging means and to contact with the rib.

10. In a device of the class described, an apron provided with a rib extending longitudinally thereof, engaging means disposed adjacent the rib, and a receptacle adapted to engage upon the engaging means and to contact at times with the rib.

11. In a device of the class described, an apron comprising a body portion having a curved upper edge with reverse curves formed adjacent opposite ends adapting the apron to be applied to trees of various circumferences.

12. In a device of the class described, an apron comprising a body portion having its upper edge concave at the middle and convex at its outer ends adapting the apron to be applied to trees of various circumferences.

13. In a device of the class described, an apron comprising a body portion having a concave upper edge with its opposite ends projected upon lines differing from the curvature at the middle and adapting the apron to be applied to trees of various circumferences.

In testimony whereof I affix my signature in presence of two witnesses.

EDWIN A. McKOY.

Witnesses:
    JOHN L. FLETCHER
    L. L. MORRILL.